United States Patent [19]
Woodard

[11] Patent Number: 5,274,739
[45] Date of Patent: Dec. 28, 1993

[54] PRODUCT CODE MEMORY ITAKURA-SAITO (MIS) MEASURE FOR SOUND RECOGNITION

[75] Inventor: Jeffrey P. Woodard, Irvine, Calif.

[73] Assignee: Rockwell International Corporation, Seal Beach, Calif.

[21] Appl. No.: 869,275

[22] Filed: Apr. 15, 1992

Related U.S. Application Data

[63] Continuation of Ser. No. 526,868, May 22, 1990, abandoned.

[51] Int. Cl.⁵ .............................................. G10L 9/00
[52] U.S. Cl. ................................................. 395/2
[58] Field of Search .................................. 381/29–45; 395/2

[56] References Cited

U.S. PATENT DOCUMENTS

| | | | |
|---|---|---|---|
| 4,718,087 | 1/1988 | Papamichalis | 381/34 |
| 4,819,271 | 4/1989 | Bahl et al. | 381/43 |
| 4,827,521 | 5/1989 | Bahl et al. | 381/43 |
| 4,977,598 | 12/1990 | Doddington et al. | 381/43 |
| 5,072,452 | 12/1991 | Brown et al. | 381/43 |

*Primary Examiner*—Michael R. Fleming
*Assistant Examiner*—Michelle Doerrler
*Attorney, Agent, or Firm*—H. Fredrick Hamann; George A. Montanye; Tom Streeter

[57] ABSTRACT

A SOUND RECOGNITION PROCESS comprises training a sound recognition system to a shape Hidden Markov Model (HMM) from a shape codebook of shape codewords, and to a separate gain HMM from a gain codebook of gain codewords. An unknown token is assigned to the sound category associated with the shape HMM and gain HMM with the greatest probability product. Shape and gain codewords replacements for incoming Linear Predictive Coded (LPC) vectors are selected by choosing the codeword with minimum distortion between the codeword and a combination of the vector and some of the preceding codewords, exponentially weighted by time.

18 Claims, 4 Drawing Sheets

PRODUCT CODE MEMORY ITAKURA-SAITO (MIS) MEASURE FOR SOUND RECOGNITION

This application is a continuation application of Applicant's parent application, Ser. No. 07/526,868, filed May 22, 1990, entitled "Sound Recognition Process," now abandoned.

BACKGROUND OF THE INVENTION

1. Technical Field

The present invention relates to the field of acoustic signal classification. The present invention economically classifies an unknown acoustic signal into one of a predetermined number of categories.

2. Background Art

A sound recognition system receives analog signals from an acoustic sensor such as a piezoelectric crystal or a microphone.

The analog signal is typically conditioned by three steps. The first step is digitization by a conventional analog-to-digital converter. The signal is next windowed into short-time frames by Hamming windows. Finally Linear Predictive Coding (LPC) is done using the autocorrelation method, to provide a short-time spectral model, which is represented as an LPC vector.

A typical approach to sound recognition after the signal conditioning has been the use of Vector Quantization (VQ) followed by Hidden Markov Models (HMMs). The VQ step provides data compression by converting each natural LPC vector into the closest one of a few previously generated artificial LPC vectors, each of which is given an integer index. The natural LPC vector for each short-time frame is replaced, for that time frame, by the appropriate index. Each sound category of interest is represented by a unique HMM. The sequence of indexes generated by VQ is used as an input to evaluate each HMM. The sound category corresponding to the HMM with the highest score is chosen as the identity of an unknown sound.

A typical sound recognition system receives an analog signal from an acoustic sensor. The signal is conditioned by performing analog-to-digital conversion followed by Hamming windows, typically 6.4 msec for non-speech sounds and 20 msec for speech sounds, and finally by LPC analysis. Any convenient signal conditioner may be used. For non-speech sounds the LPC order, that is, one less than the number of elements in the LPC vector, is typically 4, while for speech sounds the order is typically 10.

The typical sound recognition system operates in two modes: a training mode and a test mode. During training mode the sound recognition system learns characteristics of the sound categories of interest, that is, it makes an indexed list of the best artificial LPC vectors, and a list of the HMMs which best correlate these artificial vectors with the known categories of sound. Once trained, the system is ready to classify unknown sounds in the test mode, that is, to convert the sequence of LPCs under test to a sequence of artificial vector indexes, and to then select the HMM which best fits this sequence.

During the training mode, a data base called the training data base is used. The training data base is partitioned as follows. An occurrence of a sound is called a token and is typically a few seconds long. Each sound category is represented by typically a hundred tokens. For example, suppose that three categories of sound are to be distinguished: a drawer opening, a glass being filled with water, and a tool being dropped. We begin by opening a drawer a hundred times and recording each opening; each recording is a token. Likewise, a glass is filled (and emptied, between recordings) a hundred time, each recording being a token; and a tool is dropped a hundred times, each recording being a token. In each category, tokens for that category are called the training set for that category: thus there are as many training sets as categories. There are three training sets, one for each sound, each training set having a hundred tokens. In the above example, the training sets form a training data base of three hundred tokens.

In VQ, a prespecified, relatively few number of artificially generated LPC vectors are created to represent all of the LPC vectors (one for each short-time window of noise in each token) in all of the tokens in the training data base, regardless of sound category. That is, a window of noise may appear in more than one category of sound. The 20 milliseconds of noise of water first contacting a glass may be functionally identical to the 20 milliseconds of noise of a tool first contacting the floor. A typical LPC vector representing this common noise will be artificially generated if it (or the LPC vectors close enough to it) appears frequently enough in the various training sets. These few artificially generated LPC vectors can be considered averages of all the LPC vectors in the training data base. Each of these few LPC vectors is called a codeword; a collection of codewords is called a codebook. During VQ training, the codewords are selected by using the entire training data base as input to the signal conditioner, then processing the output of the signal conditioner, which is a sequence of LPC vectors, according to the well known Linde, Buzo, and Gray (LBG) clustering algorithm. The final result is a codebook of codewords, each codeword being an LPC vector. Each codeword is assigned an arbitrary index, for example 0 to 127 when the codebook has 128 codewords, as is typical. Each LPC vector has a number of dimensions equal to the LPC order plus 1. The large number of naturally occurring LPC vectors are thus quantified into a small number of codewords, and vector quantization training is complete.

Once the VQ training is done, the HMM training begins. HMM training differs from VQ training in that only one training set at a time is used, not all training sets. That is, the HMM for each category of sound is trained independently of the HMM for each other category of sound. An HMM for a given sound category is trained as follows. The training set corresponding to that sound category is selected. Each token from the set is used as an input to the signal conditioner, which generates a sequence of LPC vectors, to be used as training vectors. This sequence of LPC training vectors is then compared, one vector at a time, with the codewords in the VQ codebook. The closest matching codeword to each LPC training vector is found and the index of the codeword is the output of the VQ process. Each token is thus reduced to a sequence of indexes. The sequence of the indexes generated from the entire training set of tokens is used as the input to the HMM training algorithm, according to the well known Baum-Welch re-estimation algorithm. HMMs for each sound category are trained in turn.

Once HMM training has also been completed, the sound recognition system is ready to accept an unknown signal as an input. An unknown signal—a token—is input to the signal conditioner and the output is a sequence of LPC vectors. The LPC vectors are used as the input to the VQ. The output of the VQ is a sequence of indexes, that is, the indexes of the previously generated artificial LPCs. While the unknown signal could be used to modify the artificially generated LPC, it is preferred not to do so, since the unknown signal generally has considerable background noise, which is absent from the training tokens. The indexes are then input to the HMM comparison function. One HMM at a time is selected to be evaluated using the sequence of VQ indexes and the well known Viterbi algorithm. The output is a score, which is actually the probability, or, if desired, the log of the probability, that the HMM is the correct one. Each HMM is evaluated in turn, and the HMM with the highest score is selected. The sound category corresponding to that selected HMM is the classification of the unknown signal.

SUMMARY OF THE INVENTION

The present invention generally follows the above background art, but raises the efficiency of classification in two ways. The first enhancement is an improvement on the VQ of LPC vectors by allowing for auditory memory. A VQ which does not take into account auditory memory produces more time-varying distortion than the VQ used in the present invention. The second improvement is the use of more general HMMs. A sound recognition system may use only one HMM per sound category. In the present invention, more than one HMM is used for each sound category and the results from the individual HMMs are combined together, resulting in the use of more information to make classification decisions. These two improvements raise the classification accuracy and at the same time reduce memory and computational requirements.

The heart of VQ is the comparison of the input LPC vector with a codeword. This is equivalent to comparing one short-time spectrum with another. In VQ, the codeword which is closest, or the best match, is found for a given input LPC vector. To find the closest match requires a criterion, usually referred to as a distortion measure. One then tries to find a codeword which minimizes the distortion measure. By far the most popular distortion measure in LPC/VQ systems has been the Itakura-Saito (IS) class of distortion measures. There are several variants of this measure. All of the variants use the current LPC input vector and the current codeword under consideration for evaluation in the distortion measure.

The present invention uses a new distortion measure, called the memory IS (MIS) distortion measure, which takes into account the previously selected best codewords in evaluating the codeword for the current frame. In effect, this means that the current best codeword must not only match the current LPC input, but also past best codewords as well, thereby incorporating memory into the distortion measure. In MIS, the current LPC vector is compared against one of the codewords, say the kth codeword, using the IS measure. The resultant IS distortion is scaled by multiplication by a constant. Then a memory is accessed. A random access memory (RAM) is preferred since the "past best codewords" will change with time. In the memory are all of the past best codewords. The kth current codeword under evaluation is compared against the past N best codewords using the IS distortion measure. Each resultant distortion is multiplied by a different constant. The sums of all the scaled IS distortions are added together to form the MIS measure. The constants or scale factors are chosen exponentially, such that the current comparison is given most weight, and the most distant past comparison is given least weight. The time constant on the scale factors can be set to provide a memory as short or long as desired. Typical values have been a time constant of 75 msec using $N=35$. The sums of all the constants are normalized to one. The MIS measure is computed for each codeword in the codebook and the codeword having the minimum value is selected. The codeword is then put into memory for use in helping to select the best codeword for the next LPC input.

As previously mentioned there are several variants of the IS measure, and thus of the MIS measure. In the present invention, the so-called product code form of the IS measure is selected; thus the MIS used can be called a product code MIS measure. In the product code form of the IS measure, the VQ codebook is actually divided into two sub-codebooks. One of the sub-codebooks contains codewords that reflect only the spectral shape of an LPC vector, and are hence called shape codewords. The second sub-codebook contains codewords that reflect only the gain (average size or amplitude) of an LPC vector, and are hence called gain codewords. The dimension of the shape codewords is the same as the LPC order; the dimension of the gain codebook is 1, i.e., gain codewords are scalars. The number of shape and gain codewords need not be the same, and usually is not the same.

The product form of a distortion measure is used to separate the characteristics of loudness of a signal from its purely spectral characteristics. An input LPC vector is first compared with the shape codebook. The best matching shape codeword is found using the MIS measure, and the corresponding index is the shape output. The shape codeword has as many elements as the order of the vector. A by-product of the shape comparison is a residual energy, which is then compared with the gain codebook. The best matching gain codeword is found, also using the MIS measure; its index is the gain output. Thus the final output is a pair of indexes, one representing spectral shape and one the gain.

The significance of the product form of the MIS distortion measure is appreciated in the context of an HMM structure, a product code HMM.

Each sound is modelled with two HMMs, one corresponding to shape and one to gain. Since spectral shape and gain may be assumed to be independent, the two HMMs may be evaluated separately and the results may be combined together. The VQ shape index sequence is used as the input to the shape HMM, and the VQ gain sequence is used as the input to the gain HMM. Since the result of an evaluation is a probability (or log probability), the probabilities of the two individual HMMs are multiplied together (or added for log probabilities) to provide the joint probability that both VQ index sequences are associated with a given sound category.

The product VQ/HMM structure provides a more accurate modeling of the two separate information sources than if they were lumped together. The shape HMM may, and generally will, have a different number of states and number of indexes than the gain HMM, thereby better characterizing the underlying sound process. The product structure has been demonstrated to provide better classification performance with less computation than a prior art structure.

DETAILED DESCRIPTION OF A PREFERRED EMBODIMENT

Figure 1:
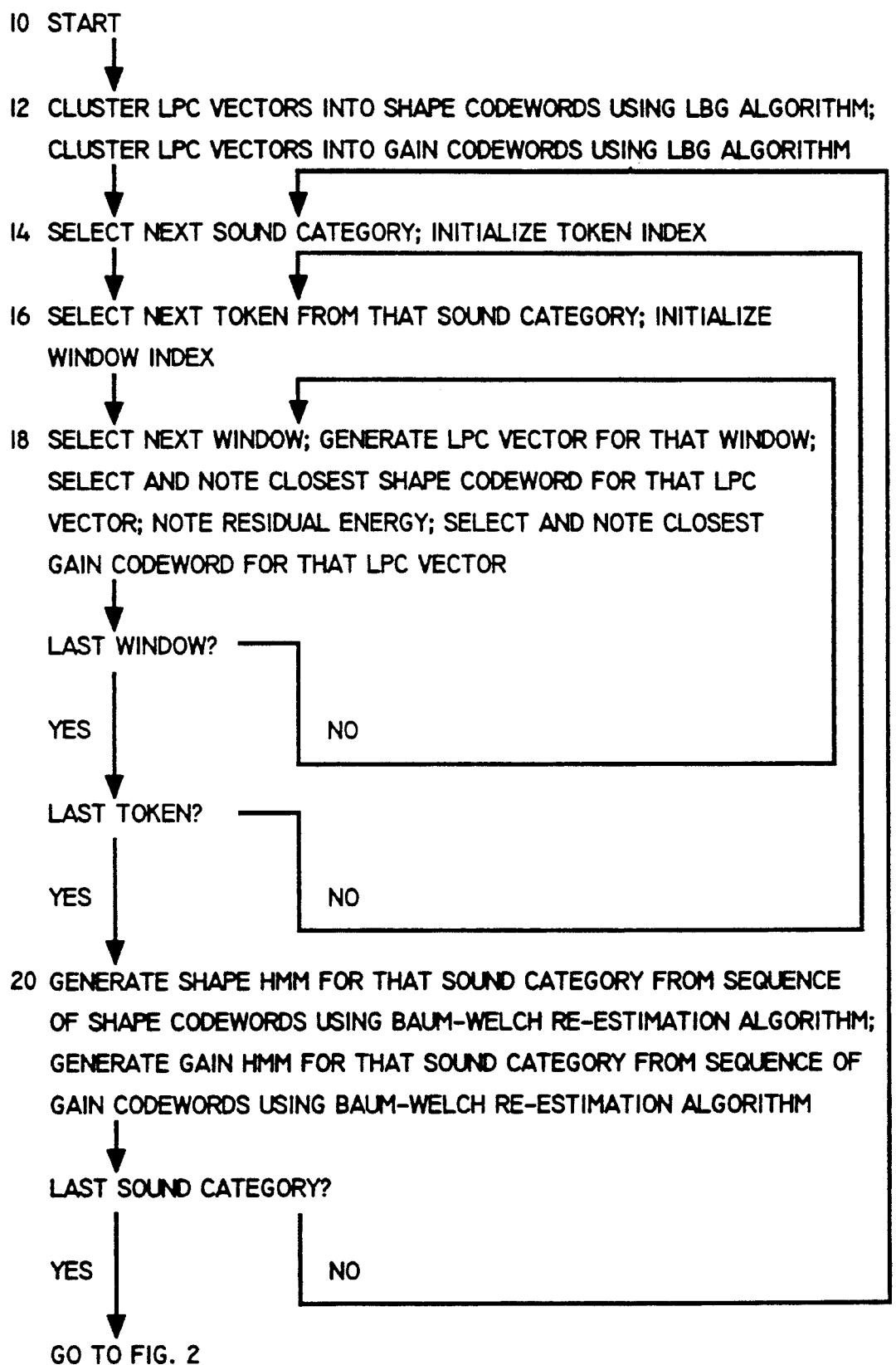
FIG. 1 shows the training algorithm.

Turning now to FIG. 1, the starting step 10 takes all of the windows of all of the tokens, converts them into LPC vectors and represents each token with an LPC vector sequence. The first step 12 of the training algorithm is to cluster these LPC vectors into shape codewords using the Linde, Buzo and Gray (LBG) algorithm using only the shapes of the LPC vectors, and not their gains. One then clusters the LPC vectors into gain codewords using the LBG algorithm, this time using only the gain of the LPC vectors, and not their shapes.

The next step 14 is to select the next sound category (opening drawer, dropping tool, etc.). One then initializes the token index by setting it equal to 0. The next step 16 is to select the next token from that sound category. Since the token index is initialized at 0, selecting the next token means to select the first token from that sound category, that is, the first time that the drawer was opened, the tool dropped, etc. One then initializes the window index by setting it to 0.

The next step 18 is to select the next window. Since the window index has been initialized at 0, this results in selecting the first window, that is, the first 10 or 20 milliseconds of sound which is suitable for generating an LPC vector. One then proceeds to generate that LPC vector for that window and to select and note the closest shape codeword for that LPC vector. This process of noting the closest shape codeword produces, as a byproduct, an evaluation of the residual energy, which is also noted. One then selects and notes the closest gain codeword for that LPC vector by matching the residual energy of the LPC vector as closely as possible to a gain codeword.

If this window is not the last window of the token, then the next window is selected, and the process is continued. If it is the last window of the token, then the next token is considered, re-initializing the window index in the process. If this is the last token, then a series of shape codewords will have been generated, and a series of gain codewords will have been generated. One then proceeds to the next step 20, in which one generates a shape Hidden Markov Models for this particular sound category from the sequence of shape codewords, using the Baum-Welch re-estimation algorithm. Likewise, one generates a gain Hidden Markov Model for that same sound category from the sequence of gain codewords, again using the Baum-Welch re-estimation algorithm. If this is not the last sound category, then the next sound category is selected, and the process is continued until the last sound category is reached. This concludes the training portion of the present invention.

Figure 2:
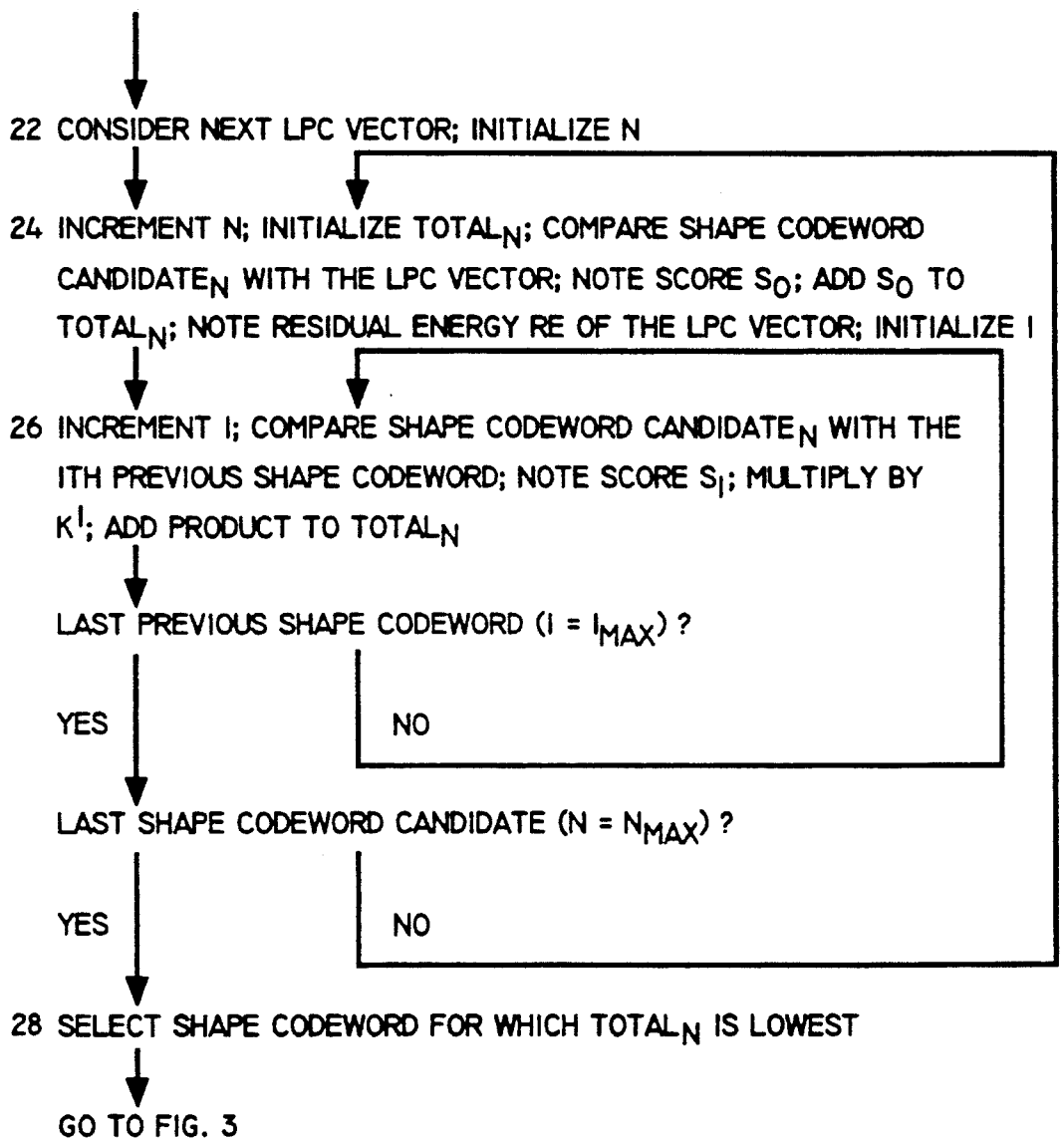
FIG. 2 shows the first portion of a test algorithm, in which a shape codeword is selected.

Once the training portion of the present invention has been completed, and Hidden Markov Models have been generated from the relatively pure samples of the sounds of interest, the invention is now ready to be taken out of the laboratory and into the field. An unknown sound is detected, and is quantized into a sequence of LPC vectors. The process of taking these noisy LPC vectors, and associating them definitely with one of the previously generated Hidden Markov Models, is shown beginning on FIG. 2.

A Hidden Markov Model cannot be derived directly from the LPC vectors. Each LPC vector must first be associated with the appropriate shape codeword, and with the appropriate gain codeword. Once the sequence of incoming LPC vectors has been transformed into a like sequence of shape codewords and gain codewords, then a shape Hidden Markov Model, and a gain Hidden Markov model, can be associated with these sequences of codewords. In general, there will be N shape codewords, and M gain codewords. We turn now to FIG. 2 for the details on how an incoming LPC vector is associated with a shape codeword. It is to be noted that this association is not merely to the closest codeword, but is more complex.

The shape codeword selection process begins with step 22, in which the next LPC vector is considered, and an index N is initialized at 0. In step 24, this index N is incremented to 1, so the first codeword is being considered. A second index $total_N$ is initialized to 0. One then compares the Nth codeword, shape codeword candidate$_N$, with the incoming LPC vector. The ordinary Itakura-Saito distortion measure is suitable. This comparison produces a score $S_O$, which is noted. $S_O$ is added to $total_N$, making $total_N$ equal to $S_O$. The comparison process produces an evaluation of the residual energy of the incoming LPC vector; this residual energy is noted as RE. A third index I is now initialized to 0.

In step 26, the index I is incremented by 1. The shape codeword candidate$_N$ is then compared with the Ith previous shape codeword, again using the ordinary Itakura-Saito distortion measure, and the resulting score $S_I$ is noted. A constant K is raised to the Ith power, and $S_I$ and $K^I$ are multiplied together. This product is added to the index $total_N$. If this is not the last of the previous shape codewords to be considered, that is, if I does not yet equal some maximum $I_{MAX}$, then I is incremented, and the process is continued. This results in a final $total_N$ for the Nth shape codeword candidate which is a function, not only of how far the candidate is from the LPC vector, but also how far the candidate is from a number of previously selected shape codewords, with the shape codewords of the more distant past having an exponentially smaller effect on the total than the shape codewords of the more recent past. The total number of previous shape codewords to be considered, $I_{MAX}$, and the expansional constant K, should be experimentally determined for the particular sound categories of interest.

Once a particular shape codeword candidate has been evaluated, the next shape codeword candidate is likewise evaluated, if there is a next shape codeword candidate. If this is the last shape codeword candidate, that is, if N equals $N_{MAX}$, then each shape codeword candidate$_N$ will have a $total_N$ associated with it; the lowest $total_N$ is selected, step 28, and its codeword is placed in a shape codeword sequence.

Figure 3:
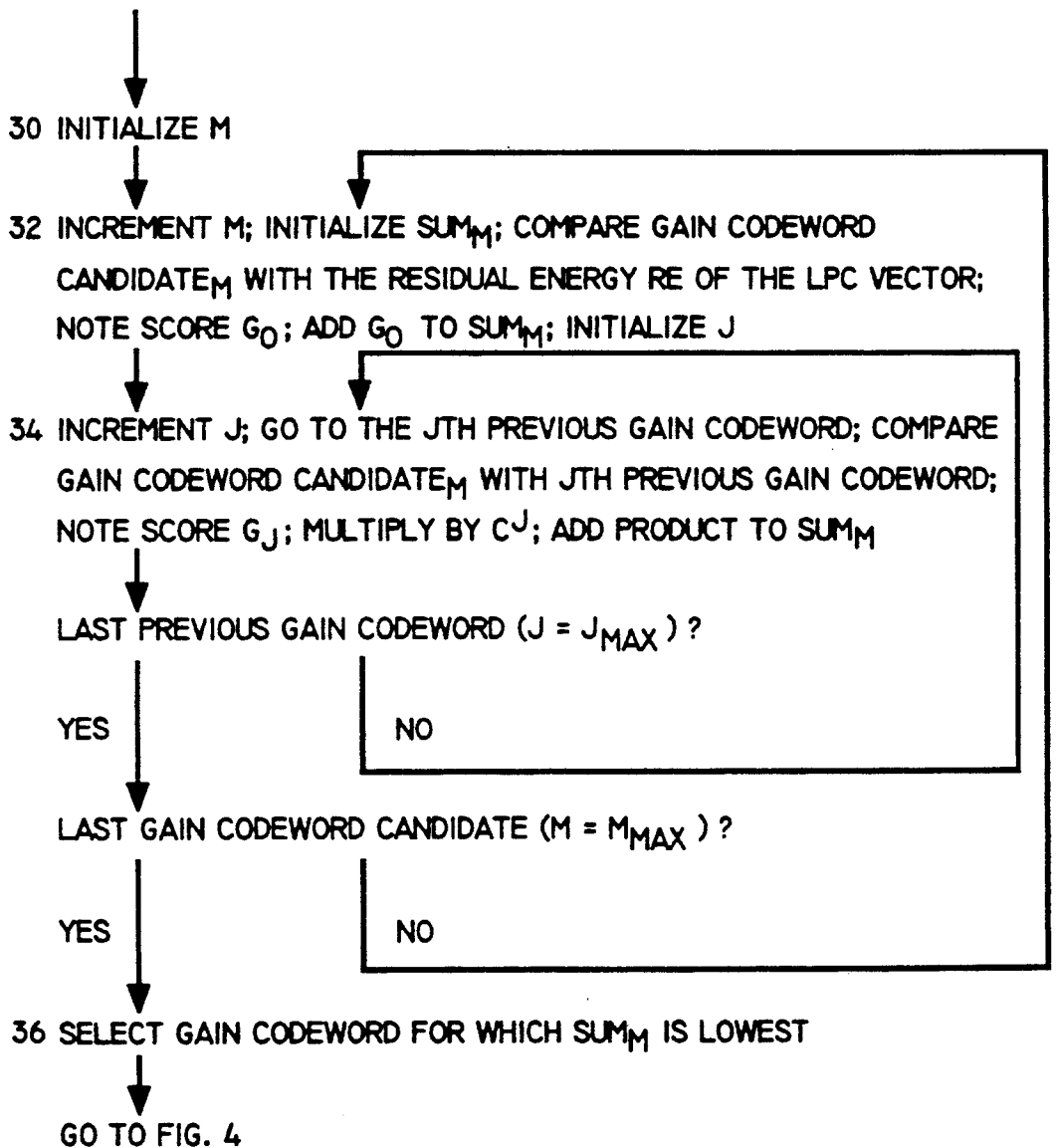
FIG. 3 shows the second portion of a test algorithm, in which a gain codeword is selected.

Turning now to FIG. 3, a similar process is shown for gain codewords rather than for shape codewords. There are M gain codewords as distinct from N shape codewords, and each gain codeword candidate$_M$ has, associated with it, an index $SUM_M$. In step 30, M is initialized to 0. In step 32, M is incremented, and $SUM_M$ is initialized to 0. One then compares gain codeword candidate$_M$ with the residual energy RE of the LPC vector, which said residual energy was first calculated and noted in step 24. The Itakura-Saito distortion score $G_O$ is noted, and $G_O$ is added to SUM$_M$, so SUM$_M$ now equals $G_O$. A second index J is initialized to 0, where J will be the number of previous gain codewords to be considered.

In step 34, J is incremented, and a Jth previous gain codeword is selected. This gain codeword and the gain codeword candidate$_M$ are compared, and the Itakura-Saito score $G_J$ resulting therefrom is noted. This score is multiplied by $C^J$, where C is another constant, similar to, and perhaps equal to, K. This product is then added to SUM$_M$. If this is not the last previous gain codeword (J is not yet equal to some maximum $J_{MAX}$), then J is incremented again, and the next previous gain codeword is selected and subjected to this process. If it is the last previous gain codeword (J equals $J_{MAX}$), then the next gain codeword candidate is selected, if there is one. If this is the last gain codeword candidate (M equals some maximum $M_{MAX}$), then there will be an entire series of gain codeword candidates$_M$, each of which has an index SUM$_M$. The one with the lowest SUM$_M$ is selected, step 36, as the gain codeword to be associated with this particular LPC vector.

The LPC vector from the first window of the unknown sound has thus been associated with a shape codeword and with a gain codeword, each of which comes from a fairly limited codebook, a code book which was generated using only relatively pure sounds. Thus, the LPC vector from the first window of the unknown sound has had a great deal of the noise extracted from it in the process of converting it to the shape codeword and gain codeword.

Figure 4:
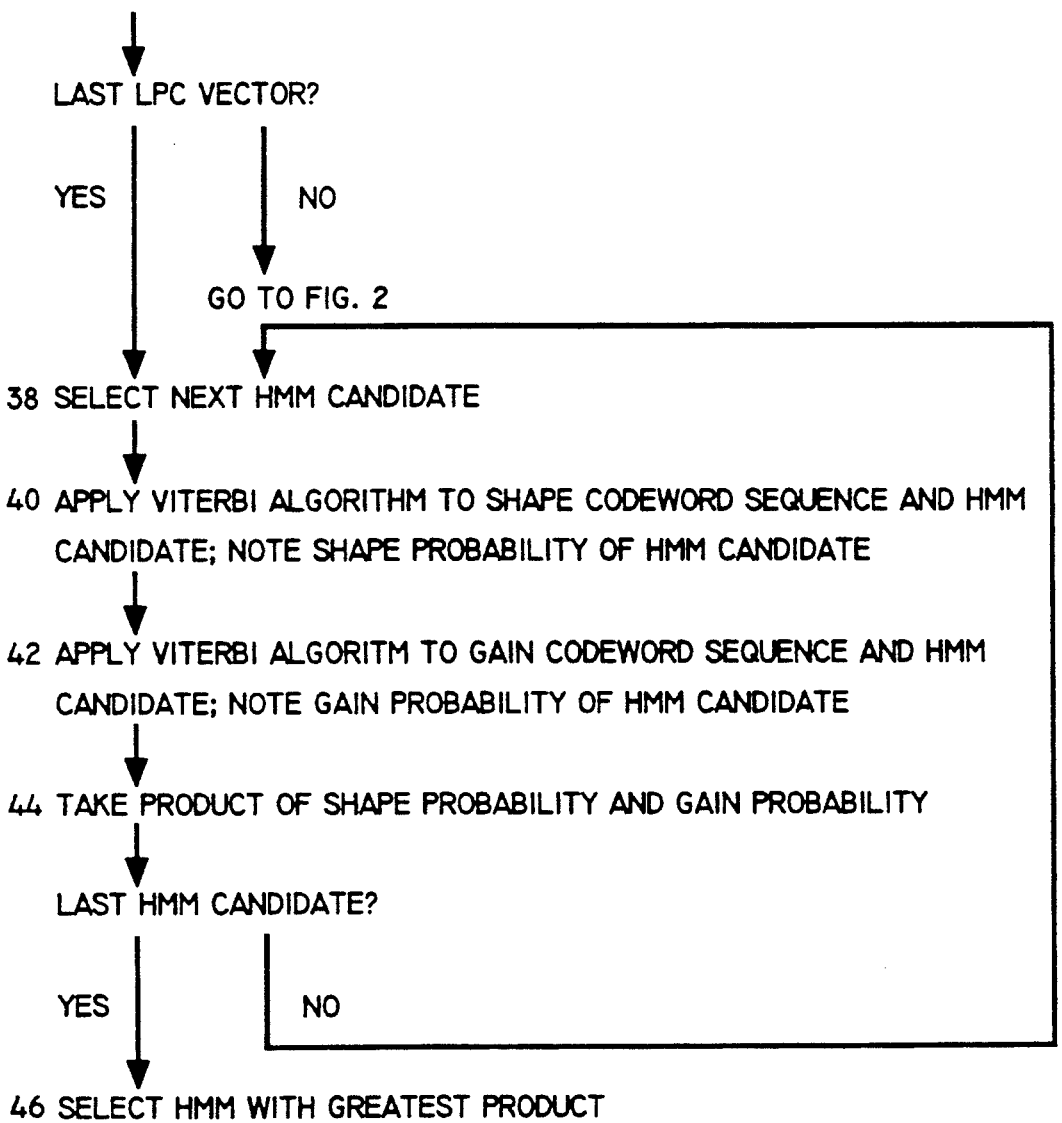
FIG. 4 shows the final portion of a test algorithm, in which a Hidden Markov Model is selected.

Turning now to FIG. 4, one considers whether this was the last LPC vector from the unknown sound. If it was not the last LPC vector, then one goes to FIG. 2 (step 22) and considers the next LPC vector. If it was the last LPC vector, then the token of unknown sound, comprising a sequence of noisy LPCs, has been reduced to a like sequence of relatively pure shape codewords and a second like sequence of relatively pure gain codewords. These sequences of shape and gain codewords may now be compared to various Hidden Markov Model candidates.

One therefore selects, at step 38, the next Hidden Markov Model candidate. The Viterbi algorithm is then applied, at step 40, to the shape codeword sequence and to the Hidden Markov Model candidate at hand. The result of this application of the Viterbi algorithm is a probability that this Hidden Markov Model candidate is the actual Hidden Markov Model. Since the Viterbi algorithm has been applied only to the shape codeword sequence thus far, this probability is called the shape probability for this particular Hidden Markov Model candidate.

One then applies, at step 42, the Viterbi algorithm to the gain codeword sequence and to the Hidden Markov Model candidate, thereby generating a gain probability that this Hidden Markov Model candidate is the correct Hidden Markov Model.

This shape probability and this gain probability are then multiplied together, at step 44, to produce a product, which is an evaluation of how likely the particular Hidden Markov Model candidate under consideration is to be the actual Hidden Markov Model. If this is not the last Hidden Markov Model candidate, then the next one is selected, at step 38, and is likewise subjected to steps 40, 42, and 44. If it is the last Hidden Markov Model candidate, then the sequence of candidates will have generated a like sequence of products, and the candidate with the greatest product is selected. Since each Hidden Markov Model is uniquely associated with a single sound category, the most likely sound category has been determined. It is desirable to display, not only the sound with the most likely probability, but a plurality of likely sounds, and the probability of each one of those plurality being the correct sound.

INDUSTRIAL APPLICABILITY

The present invention is capable of exploitation in industry, and can be used, whenever it is desired to categorize sounds into categories of interest. Each step, taken individually, is entirely conventional, and the apparatus performing each step may likewise be entirely conventional, or its non-conventional counterpart may be used, if desired.

While a preferred embodiment has been described, the present invention is not limited to this embodiment, but is limited only by the appended claims.

What is claimed is:

1. A method of recognizing a sound token, the method comprising the steps of:
   (a) converting an acoustic signal from the token into an analog electric signal;
   (b) converting the analog electrical signal into a digital electrical signal;
   (c) windowing the digital signal into short-time frames by Hamming windows;
   (d) providing a sound recognition system of the Linear Predictive Coding (LPC)/Hidden Markov Model (HMM) type with a shape codebook of shape codewords in a memory, a plurality of shape HMMs, a gain codebook of gain codewords in a memory, and a plurality of gain HMMs, each combination of shape HMM and gain HMM being associated with a sound category;
   (e) Linear Predictive Coding the windowed digital signal into an LPC vector sequence, one LPC vector for each window;
   (f) providing the LPC vector sequence to the sound recognition system;
   (g) determining, for each LPC vector of the LPC vector sequence, a shape codeword having the least distortion, according to a pre-selected Itakura-Saito measure, to a combination of that LPC vector and a weighted selection of preceding shape codewords, and replacing the respective vector with the determined codeword, thereby producing a shape codeword sequence;
   (h) determining, for each LPC vector of the LPC vector sequence, a gain codeword having the least distortion, according to a pre-selected Itakura-Saito measure, to a combination of that LPC vector and a weighted selection of preceding gain codewords, and replacing the respective vector with the determined codeword, thereby producing a gain codeword sequence;
   (i) comparing each shape HMM with the shape codeword sequence and determining the shape probability of the compared shape HMM;
   (j) comparing each gain HMM with the gain codeword sequence and determining the gain probability of the compared gain HMM;
   (k) determining a probability product of each shape HMM probability according to step (i) multiplied by each gain HMM probability according to step (j);

(l) associating the probability product with the sound category associated with that combination of shape HMM and gain HMM; and (m) displaying the sound category with the greatest probability product.

2. The method of claim 1, further comprising the step of displaying a sound category associated with the shape HMM and gain HMM producing each probability product, together with the probability product.

3. The method of claim 1, wherein:
(a) the step of determining the probability product of each shape HMM probability according to step (i) of claim 2 multiplied by each gain HMM probability according to step (j) of claim 2 further comprises the step of appending such probability product to a sequence of such probability products; and
(b) the method of claim 2 further comprises the steps of:
(1) determining a greatest such probability product in the sequence of such probability products; and
(2) displaying a representation of the sound category associated with such greatest probability product.

4. The method of claim 1, wherein each of the steps of replacing each LPC vector with the respective shape and gain codewords closest to a combination of that LPC vector and a weighted selection of respective preceding shape and gain codewords, thereby producing respective shape and codeword sequences, further comprises:
(a) comparing a codeword candidate with the LPC vector and producing an LPC vector distortion measure;
(b) adding the LPC vector distortion measure to a sum;
(c) comparing the codeword candidate with the next preceding codeword and producing a next codeword distortion measure;
(d) multiplying the next codeword distortion measure by a next preselected constant to produce a next product;
(e) adding the next product to the sum;
(f) repeating steps (c) through (e) a preselected number of times;
(g) noting the sum for the codeword candidate under consideration;
(h) repeating steps (a) through (g) for each codeword candidate; and
(i) determining a codeword candidate with the lowest sum.

5. The method of claim 4, wherein the step (f) preselected number of times for shape codewords is the same as the step (f) preselected number of times for gain codewords.

6. The method of claim 4, wherein the step (f) preselected number of times for shape codewords is different from the step (f) preselected number of times for gain codewords.

7. The method of claim 4, wherein each next preselected constant equals the previously calculated preselected constant multiplied by a fixed constant which lies between zero and one, thereby producing an exponential weighting.

8. The method of claim 7, wherein the fixed constant for shape codewords is the same as the fixed constant for gain codewords.

9. The method of claim 7, wherein the fixed constant for shape codewords is different from the fixed constant for gain codewords.

10. An apparatus for recognizing a sound token the apparatus comprising:
(a) means for converting an acoustic signal from the token into an analog electric signal;
(b) means for converting the analog electrical signal into a digital electrical signal;
(c) means for windowing the digital signal into short-time frames by Hamming windows;
(d) a sound recognition system of the Linear Predictive Coding (LPC)/Hidden Markov Model (HMM) type comprising a shape codebook of shape codewords in a memory, a plurality of shape HMMs, a gain codebook of gain codewords in a memory, and a plurality of gain HMMs, each combination of shape HMM and gain HMM being associated with a sound category;
(e) means for Linear Predictive Coding the windowed digital signal into an LPC vector sequence, one LPC vector for each window;
(f) means for providing the LPC vector sequence to the sound recognition system;
(g) means for determining, for each LPC vector of the LPC vector sequence, a shape codeword having the least distortion, according to a pre-selected Itakura-Saito measure, to a combination of that LPC vector and a weighted selection of preceding shape codewords, for replacing the respective vector with the determined codeword, and for thereby producing a shape codeword sequence;
(h) means for determining, for each LPC vector of the LPC vector sequence, a gain codeword having the least distortion, according to a pre-selected Itakura-Saito measure, to a combination of that LPC vector and a weighted selection of preceding gain codewords, for replacing the respective vector with the determined codeword, and for thereby producing a gain codeword sequence;
(i) means for comparing each shape HMM with the shape codeword sequence and determining the shape probability of the compared shape HMM;
(j) means for comparing each gain HMM with the gain codeword sequence and determining the gain probability of the compared gain HMM;
(k) means for determining a probability product of each shape HMM probability according to step (i) multiplied by each gain HMM probability according to step (j);
(l) means for associating the probability product with the sound category associated with that combination of shape HMM and gain HMM; and
(m) means for displaying the sound category with the greatest probability product.

11. The apparatus of claim 10, wherein:
(a) the means for determining the probability product of each shape HMM probability multiplied by each gain HMM probability further comprises means for appending such probability product to a sequence of such probability products; and
(b) the apparatus of claim 10 further comprises means for displaying a representation of the sound category associated with the shape HMM and gain HMM producing each probability product, together with the probability product.

12. The apparatus of claim 10, wherein:

(a) the means for determining the probability product of each shape HMM probability according to step (i) of claim 10 multiplied by each gain HMM probability according to step (j) of claim 10 further comprises means for appending such probability product to a sequence of such probability products; and (b) the apparatus of claim 10 further comprises means for:

(1) determining a greatest such probability product in the sequence of such probability products; and (2) displaying a representation of the sound category associated with such greatest probability product.

13. The apparatus of claim 10, wherein each of the means for replacing each LPC vector with the respective shape and gain codewords closest to a combination of that LPC vector and a weighted selection of respective preceding shape and gain codewords, thereby producing respective shape and codeword sequences, further comprises:

(a) means for comparing a codeword candidate with the LPC vector and producing an LPC vector distortion measure;

(b) means for adding the LPC vector distortion measure to a sum;

(c) means for comparing the codeword candidate with the next preceding codeword and producing a next codeword distortion measure;

(d) means for multiplying the next codeword distortion measure by a next preselected constant to produce a next product;

(e) means for adding the next product to the sum;

(f) means for repeatedly activating elements (c) through (e) a preselected number of times;

(g) means for noting the sum for the codeword candidate under consideration;

(h) means for repeatedly activating elements (a) through (g) for each codeword candidate; and (i) means for determining a codeword candidate with the lowest sum.

14. The apparatus of claim 13, wherein the element (f) preselected number of times for shape codewords is the same as the element (f) preselected number of times for gain codewords.

15. The apparatus of claim 13, wherein the element (f) preselected number of times for shape codewords is different from the element (f) preselected number of times for gain codewords.

16. The apparatus of claim 13, wherein each next preselected constant equals the previously calculated preselected constant multiplied by a fixed constant which lies between zero and one, thereby producing an exponential weighting.

17. The apparatus of claim 16, wherein the fixed constant for shape codewords is the same as the fixed constant for gain codewords.

18. The apparatus of claim 16, wherein the fixed constant for shape codewords is different from the fixed constant for gain codewords.

* * * * *